W. A. SMITH.
DRILLING APPARATUS.
APPLICATION FILED AUG. 29, 1916. RENEWED SEPT. 16, 1919.
1,319,975.
Patented Oct. 28, 1919.
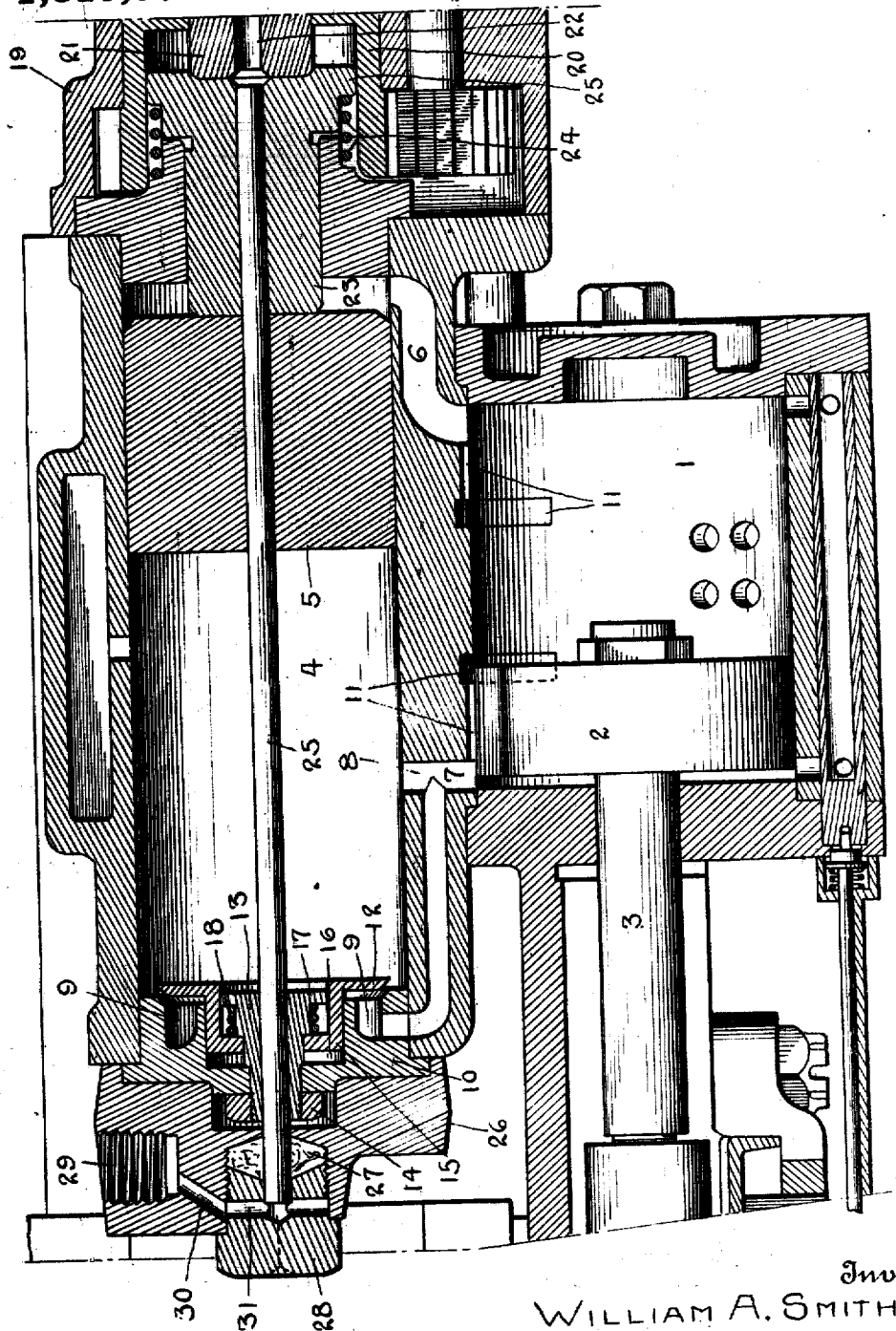
Inventor
WILLIAM A. SMITH,
By
Attorney

UNITED STATES PATENT OFFICE.

WILLIAM A. SMITH, OF DENVER, COLORADO, ASSIGNOR TO THE DENVER ROCK DRILL MANUFACTURING COMPANY, OF DENVER, COLORADO, A CORPORATION OF DELAWARE.

DRILLING APPARATUS.

1,319,975.     Specification of Letters Patent.     Patented Oct. 28, 1919.

Original application filed September 26, 1914, Serial No. 833,644. Divided and this application filed August 29, 1916, Serial No. 117,483. Renewed September 16, 1919. Serial No. 324,216.

*To all whom it may concern:*

Be it known that I, WILLIAM A. SMITH, a citizen of the United States, residing at Denver, in the county of Denver and State of Colorado, have invented certain new and useful Improvements in Drilling Apparatus, of which the following is a specification.

The present invention relates to rock drilling apparatus, and this application is a division of application Serial No. 833,644, filed September 26, 1914.

One of the objects of the invention is to provide novel and effective means for delivering a cleansing agent to the bore of a hollow drill bit for the purpose of removing the cuttings from the drill hole, and while particularly intended for drilling apparatus of the so-called pulsator type, in view of the official requirement of division, is possibly of utility in connection with other types of apparatus.

An embodiment of the invention that has proven satisfactory is disclosed in the accompanying drawing, which is a detail longitudinal sectional view through a portion of a pulsator apparatus.

Similar reference numerals designate corresponding parts in all the figures of the drawings.

In the embodiment disclosed, portions of a compressor and a motor are illustrated, the compressor including a cylinder member 1 containing a piston 2, to which is attached a piston rod 3 projecting from the cylinder member and connected to suitable operating mechanism, not shown.

The drilling motor comprises a cylinder member 4, within which is located a free hammer piston 5 that is driven back and forth by the air alternately compressed on opposite sides of the piston 2 during its reciprocation. This air passes from the compressor cylinder 1 to the motor cylinder 4 on opposite sides of the piston 5, through passages 6 and 7, the passage 7 having a front port 8 and a rear port 9 that is in the form of a circular groove in the inner face of a rear head bushing 10. Relief channels 11 are connected with the said passages and ports.

The rear port 9 is controlled by a forwardly opening valve 12 mounted on a spindle 13 secured in the bushing 10 by a nut 14 threaded upon the rear end of said spindle, which projects through said bushing. This valve constitutes in effect a check valve, and it has a hub portion 15 slidably mounted on the reduced portion of the spindle 13, the hub having an inturned flange 16 at its inner end. The front end of the spindle 13 has an outstanding flange 17, and a coiled spring 18 surrounding the spindle and interposed between the flanges 16 and 17 serves to urge the valve to closed position.

The front end of the motor cylinder member 4 is provided with a head bushing, a portion of which is shown at 19, and said bushing contains a rotatable drill holding chuck 20. Said chuck has a socket arranged to detachably receive the rear end of a tool 21, said tool being rotatable with the chuck in a manner well understood. This tool is provided with a passageway 22 therethrough for the purpose of delivering cleansing fluid to the bottom of the drill hole. A tappet 23 is slidably mounted in the head, its inner end projecting into the cylinder member 4 in a position to be struck by the piston 5, its outer end abutting against the rear end of the tool or drill bit 21. In order that the abutting faces of the tappet and drill bit may also be in proper contact to obviate leakage of the cleansing fluid, a coiled spring 24 may be arranged to abut against the flanged front end 25 of the tappet to urge the same forwardly.

For the purpose of delivering cleansing fluid to the bore 22 of the drill bit, a tube 25 extends longitudinally and centrally through the cylinder 4, through the piston 5 and into the tappet 23, terminating short of the front end of said tappet, this tube also extending through a central bore formed in the valve supporting stem 13, and having its rear end mounted in the rear head 26 of the cylinder member 4. Said rear end is secured and the tube held in place by yielding packing 27 surrounding the rear end, said packing being compressed against the tube by a plug or gland 28 threaded into the socket, into which the rear end of the tube projects. The cleansing fluid is supplied from any suitable source by means connected to the head 26, said head having a threaded socket 29 for such connection, and the fluid so supplied is delivered through a passageway 30 in the head 26 to lateral ports 31 formed in the plug or gland 28.

The cleansing agent, preferably water, is thus delivered to the drill bit through the tube 25 and tappet 23 which directs such fluid into the bore 22 of the bit, a relatively tight joint being maintained between the tappet and the rear end of the drill bit by the spring 24, so that there is little leakage at the joint between the tubes.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In drilling apparatus, the combination with a motor comprising a cylinder member and a piston operating therein, of means for delivering motive fluid to the piston to actuate it including a rear passage opening into the cylinder member, a valve controlling such passage, a hollow tool to be operated on by the piston, and means extending through the valve for delivering cleansing fluid to the tool.

2. In drilling apparatus, the combination with a motor comprising a cylinder member and a piston operating therein, of means for delivering motive fluid to the piston to actuate it including a rear passage opening into the cylinder member, a valve controlling such passage, a hollow tool to be operated on by the piston, and means for delivering cleansing fluid to the tool including a tube extending through the valve and piston.

3. In drilling apparatus, the combination with a motor comprising a cylinder member and a piston operating therein, of means for delivering motive fluid to the piston to actuate it including a rear passage opening into the cylinder member, a valve controlling such passage, a stem on which the valve is mounted, a hollow tool to be operated on by the piston, and means for delivering cleansing fluid to the tool including a tube engaged in the stem.

4. In drilling apparatus, the combination with a motor comprising a cylinder member and a piston operating therein, of means for delivering motive fluid to the piston to actuate it including a rear passage opening into the cylinder member, a forwardly projecting stem and having a bore therethrough, a controlling valve for the passage slidably mounted on the stem, a spring interposed between the spindle and valve for normally holding said valve closed, a rear head for the cylinder member, and a tube mounted in the rear head and extending through the piston.

5. In drilling apparatus, the combination with a cylinder member having a head and a bushing arranged at the inner side of the head, of a piston operating in the cylinder member, means for supplying motive fluid to the cylinder member through the bushing, and means for supplying cleansing fluid through the head and bushing to a tool operated on by the piston.

6. In drilling apparatus, the combination with a cylinder member having a head and a bushing arranged at the inner side of the head, of a piston operating in the cylinder member, means engaged with the bushing for supplying motive fluid to the cylinder member, and a tube mounted on the head and passing through the bushing and piston to deliver cleansing fluid to a tool operated on by the piston.

7. In drilling apparatus, the combination with a cylinder member, of a piston operating therein, a tube for supplying cleansing fluid to a tool operated on by the piston, and means surrounding the tube for controlling the flow of motive fluid supplied to the cylinder member for actuating said piston.

8. In drilling apparatus, the combination with a cylinder member, of a piston therein, a tube for supplying cleansing fluid to a tool operated on by the piston, and a check valve surrounding the tube for controlling the flow of motive fluid to the cylinder member for actuating said piston.

In testimony whereof I affix my signature in the presence of two witnesses.

WILLIAM A. SMITH.

Witnesses:
D. E. STROUT,
H. E. FISKE.